(12) United States Patent
Wu et al.

(10) Patent No.: US 7,520,847 B1
(45) Date of Patent: Apr. 21, 2009

(54) TOOL MAGAZINE OF AUTOMATIC TOOL CHANGER

(75) Inventors: Chi-Chung Wu, Taichung (TW); Yueh-Hsia Li, Taichung (TW)

(73) Assignee: Campro Precision Machinery Co., Ltd., Taichung (TW)

( * ) Notice: Subject to any disclaimer, the term of this patent is extended or adjusted under 35 U.S.C. 154(b) by 0 days.

(21) Appl. No.: 12/214,332

(22) Filed: Jun. 18, 2008

(51) Int. Cl.
*B23Q 3/157* (2006.01)
(52) U.S. Cl. .............................. 483/61; 483/60; 483/65; 483/66; 483/51; 483/57; 483/56
(58) Field of Classification Search ............. 483/58–59, 483/60, 61, 62, 65, 66, 68, 51, 49, 36, 57, 483/56; 211/1.51, 69, 70.6
See application file for complete search history.

(56) References Cited

U.S. PATENT DOCUMENTS

| | | | | |
|---|---|---|---|---|
| 3,298,098 A | * | 1/1967 | Gleisner, Jr. | 483/47 |
| 3,818,580 A | * | 6/1974 | Pagella et al. | 483/60 |
| 4,087,901 A | * | 5/1978 | Lohneis et al. | 483/61 |
| 4,557,035 A | * | 12/1985 | Rutschle et al. | 483/62 |
| 4,683,638 A | * | 8/1987 | Winkler et al. | 483/66 |
| 5,281,194 A | * | 1/1994 | Schneider | 483/62 |
| 5,688,215 A | * | 11/1997 | Mase et al. | 483/66 |
| 6,579,216 B2 | * | 6/2003 | Germerodt et al. | 483/68 |

* cited by examiner

*Primary Examiner*—Erica E Cadugan
(74) *Attorney, Agent, or Firm*—Charles E. Baxley (57) ABSTRACT

A tool magazine of an automatic tool changer applicable to a machine tool, comprises a magazine body and a plurality of tool holders each being slidably attached to the magazine body and holding a tool head. The tool magazine is characterized by that the tool magazine includes a tool-delivering mechanism for delivering the tool holder that holds the tool to a predetermined position away from the magazine body and disengaging the tool from the tool holder.

15 Claims, 8 Drawing Sheets

TOOL MAGAZINE OF AUTOMATIC TOOL CHANGER

BACKGROUND OF THE INVENTION

1. Technical Field

The present invention relates to an automatic tool changer of a machine tool, and more particularly, to a tool magazine of an automatic tool changer applied to a machine tool.

2. Description of Related Art

An ATC (Automatic Tool Changer) is typically provided to a machine tool to significantly improve the efficiency of the machine tool by saving time in moving, switching, installing and storing tools as well as adjusting and calibrating the machine tool. That is to say, the reliability as well velocity of an ATC can directly affect the efficiency of a machine tool it serves and thus are usually taken as the major index for design, selection and evaluation of an ATC.

The conventional ATC generally has a tool magazine for storing tools and an automatic tool-changing arm simultaneously holding and exchanging a tool to be replaced as well as another tool to be assembled to a machine tool. Traditionally, for providing accessibility to the automatic tool-changing arm, the tool magazine is arranged beside the machine tool. However, the tool magazine attached to a lateral of the machine tool can lead to machine vibration due to asymmetric balance of the entire machine tool and therefore brings an additional need of a balance weight. Besides, the traditional tool magazine is limited in its volume and capacity otherwise it can not be properly arranged beside the machine tool.

Hence, a need exists for providing an automatic tool changer with a tool magazine that does not cause asymmetric balance of an entire machine tool and is free from limitations in its volume as well as capacity.

SUMMARY OF THE INVENTION

In view of the aforementioned need, the present invention provides a tool magazine for an automatic tool changer that comprises improved tool holders and an extendable tool delivering device.

One objective of the present invention is to provide a tool magazine for an automatic tool changer that serves to deliver a tool to an automatic tool-changing arm of the automatic tool changer so that the tool magazine can overcome the limitation of the tool-changing arm and be settled behind a machine tool, thereby preventing asymmetric balance of the entire machine tool.

Another objective of the present invention is to provide a tool magazine for an automatic tool changer that is settled behind a machine tool, and is free to extend and is possible to provide an enhanced capacity according to practical needs.

Another objective of the present invention is to provide a tool magazine for an automatic tool changer that holds tools more stably and discharges the tools therefrom more smoothly so as to efficiently enhance the efficiency of the automatic tool changer.

Still another objective of the present invention is to provide a tool magazine for an automatic tool changer that has a compact design that frees the cylinder from interruption of air tubes and allows the cylinder to move smoothly.

To achieve these and other objectives of the present invention, the disclosed tool magazine comprises a magazine body and a plurality of tool holders each being slidably attached to the magazine body and holding a tool head.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
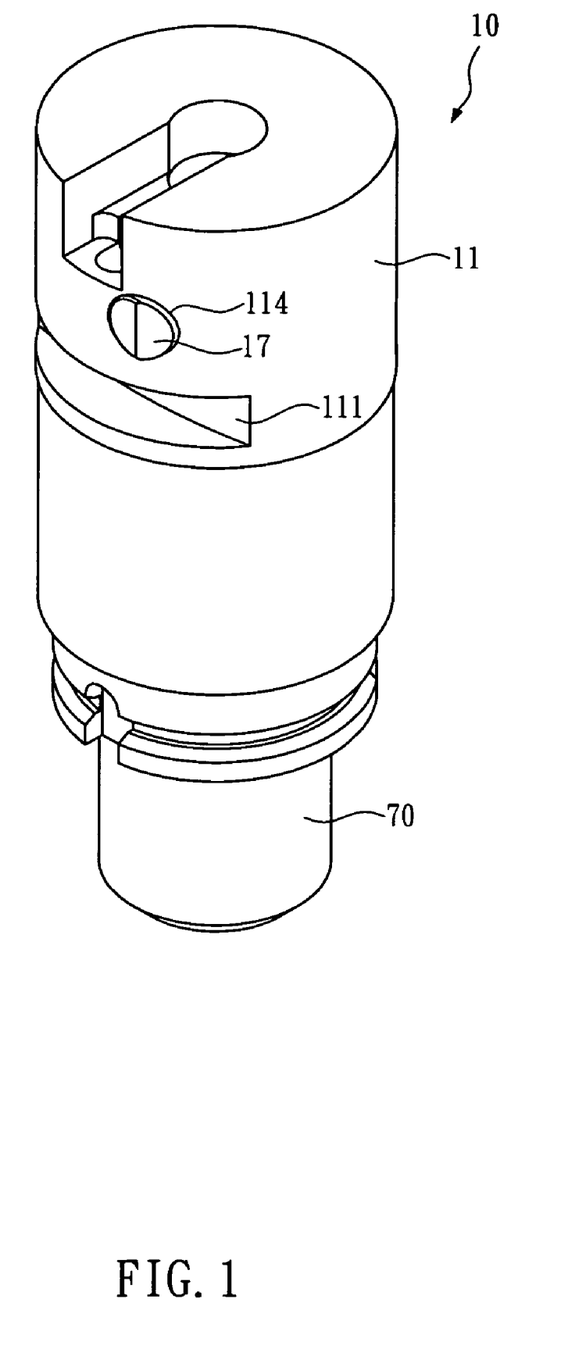
FIG. 1 is a perspective view of a tool holder of the present invention and a tool head assembled.
Figure 2:
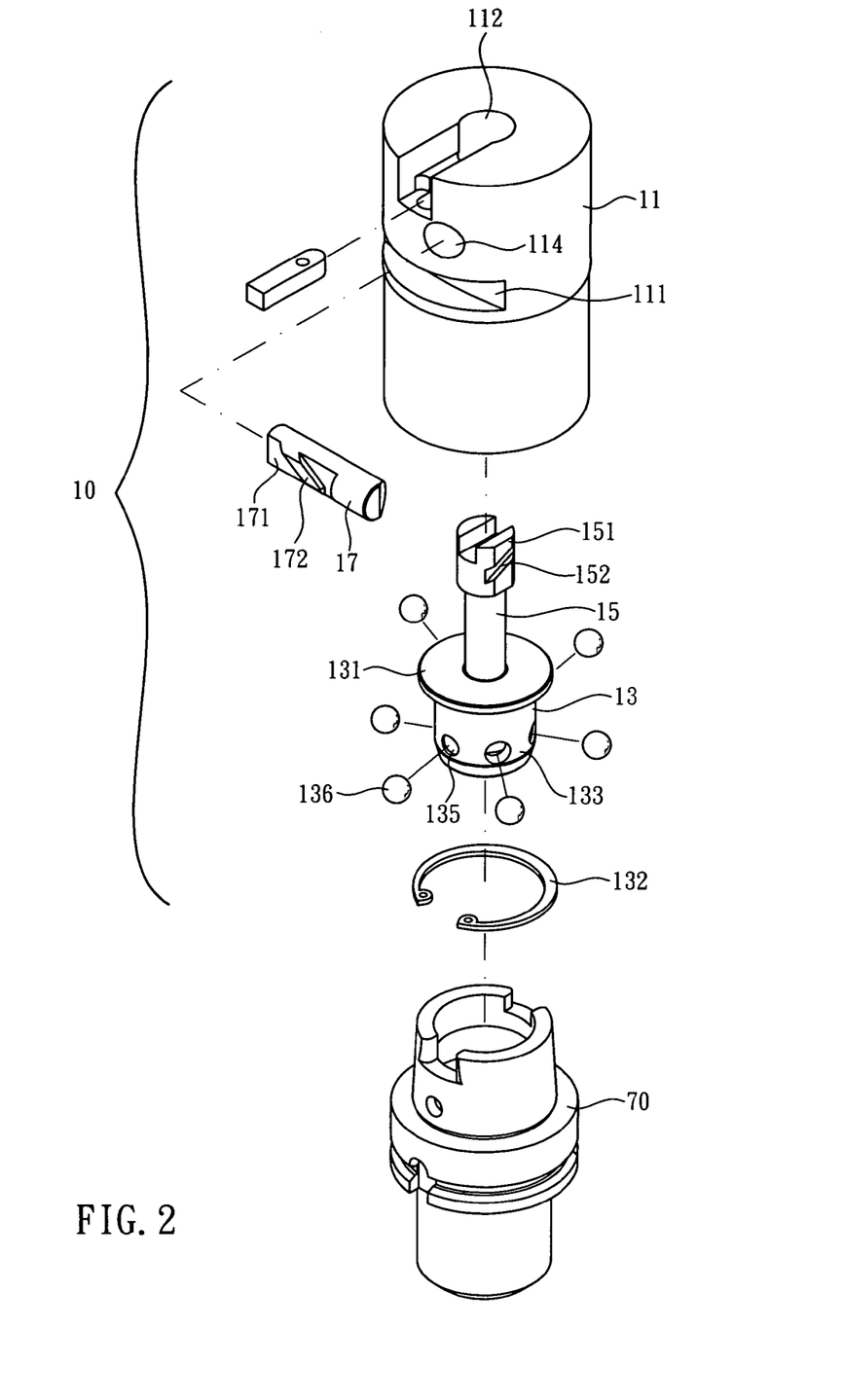
FIG. 2 is an exploded view of the tool holder and the tool head of FIG. 1.
Figure 3:
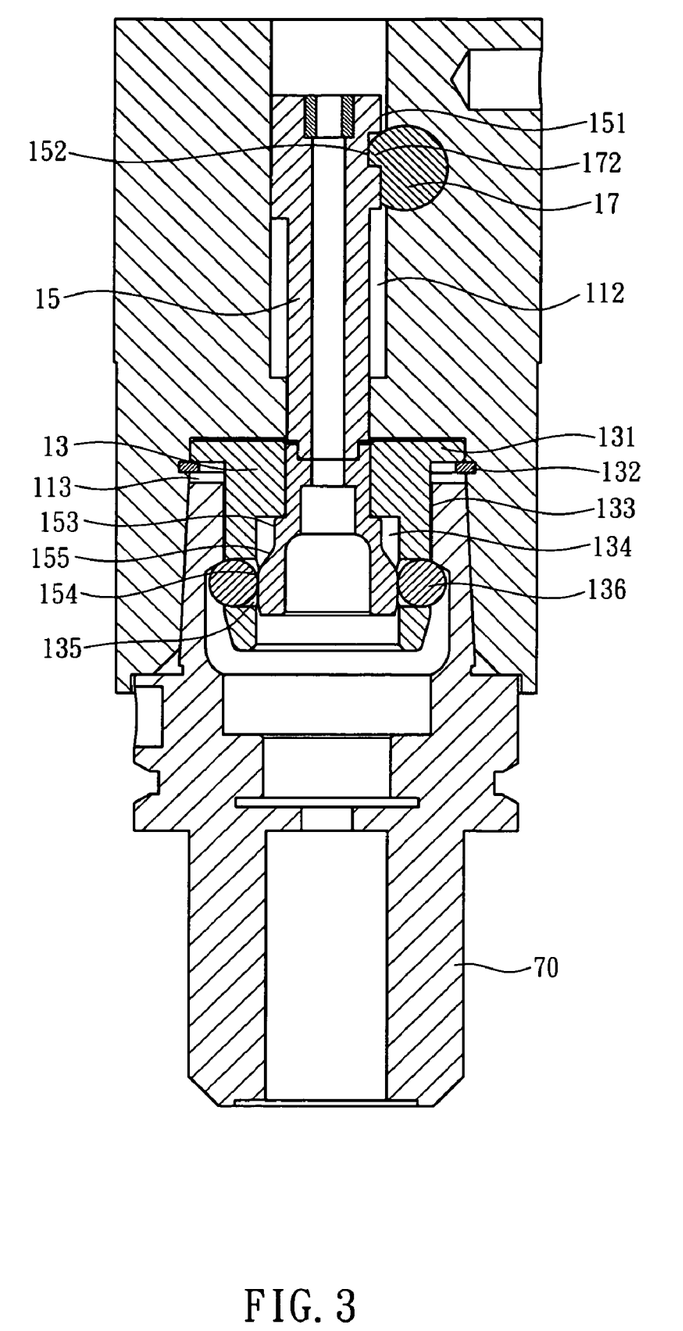
FIG. 3 is a cross-sectional view of the tool holder, showing the tool head retained thereon.

Please refer to FIGS. 1 to 3 for a preferred embodiment of a tool holder 10 of the present invention assembled with a tool head 70. Therein, the tool holder 10 comprises a housing 11, a tool seat 13 providing at a lower end of the housing 11, and a movable shaft 15 axially passing through the housing 11 and the tool seat 13.

The housing 11 is substantially formed as a hollow column with a groove 111 provided thereon for being engaged with a rail 21 of a magazine body 20. An accommodating space is axially formed in the housing 11 and has an upper portion thereof defined as a first shaft-receiving portion 112 fittingly accommodating the movable shaft 15 and a lower portion thereof defined as an expanded seat-receiving portion 113 opened to the lower end of the housing for accommodating the tool seat 13. Besides, a guiding pin hole 114 is formed on the housing 11 corresponding to the first shaft-receiving portion 112 and diverging from an axis of the housing 11 so that the guiding pin hole 114 has a part thereof communicated with the first shaft-receiving portion 112.

The tool seat 13 is also formed as a column and has a flange 131 to be coupled with an upper edge of the seat-receiving portion 113 of the housing 11. Below the flange 131, the tool seat 13 is formed with a contracted periphery 133 that embraces a second shaft-receiving portion 134 that has an relatively contracted upper section and a relatively extended lower section both communicating with the first shaft-receiving portion 112 of the housing 11. The periphery 133 has a plurality of radially extended ball channels 135 corresponding to the extended lower section of the second shaft-receiving portion 134 wherein each of the ball channels 135 receives a ball 136. As the ball channel 135 is formed as an outward tapered channel, along the ball 136 sliding along in ball channel 135, it can slide inward to enter the second shaft-receiving portion 134 and it can slide outward to a limit position where it is retained by an opening of the channel 135, wherein when the ball 136 is at the limit position, it partially jut out the opening. In other words, the ball 136 is moveable between jutting out and retracting from the periphery 133.

The movable shaft 15 has an upper end and a lower end thereof radially expanded. The upper end is formed with a first guiding surface 151 which is a plane provided with a slanted guiding groove 152. The lower end is formed with a ball receiving section 153 and a ball propping section 154. The ball propping section 154 has a diameter matching a diameter of the extended lower section of the second shaft-receiving portion 134 while the ball receiving section 153 and the ball propping section 154 are connected with an arched surface 155.

A guiding pin 17 is movably settled in the guiding pin hole 114 on the housing 11 and has a second guiding surface 171 whereon a slanted guiding ridge 172 matching the slanted guiding groove 152 on the first guiding surface 151 of the movable shaft 15 is formed.

Thereby, when the tool holder 10 are assembled, the upper end of the movable shaft 15 is received in the first shaft-receiving portion 112 and has its first guiding surface 151 corresponds to the guiding pin hole 114 while having its slanted guiding groove 152 with one end thereof engaged with the of the guiding pin 17. The ball receiving section 153 at the lower end of the movable shaft 15 now has its upper end abuts the upper edge of the second shaft-receiving portion 134 of the tool seat 13. At this time, the ball propping section 154 is positioned to align with the ball channels 135. Since the diameter of the ball propping section 154 matches that of the second shaft-receiving portion 134, the balls 136 are propped out from the ball channels 135 so that each said ball 136 has its partial surface jutting out the contracted periphery 133 of the tool seat 13. Meanwhile, a tool head 70 has a circular flange formed therein retained by the flange 131 of the tool seat 13 and the surfaces of the balls 136, thereby being fastened below the tool holder 10.

Figure 4:
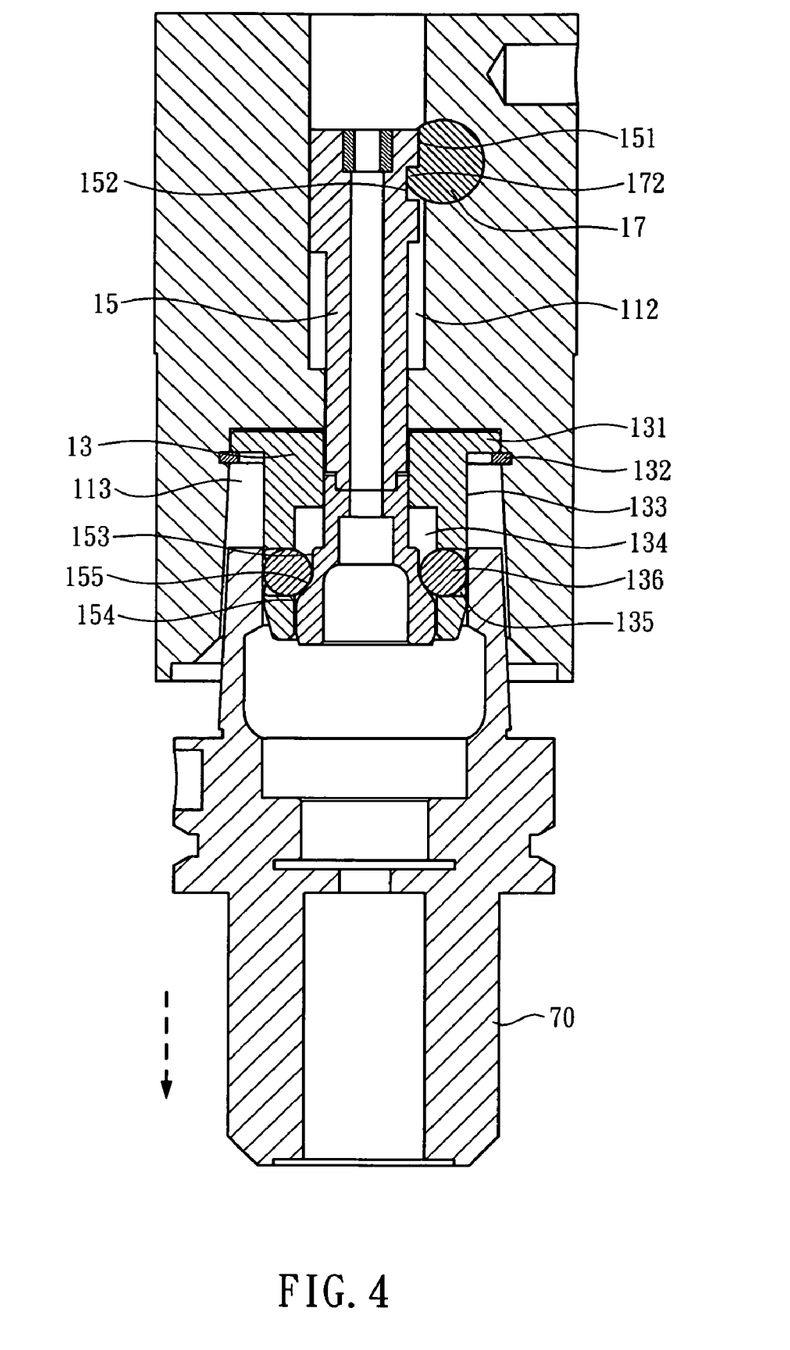
FIG. 4 is another cross-sectional view of the tool holder, showing the tool head disassembled therefrom.

Referring to FIG. 4, when the guiding pin 17 is pushed inward in the guiding pin hole 114 from he exterior of the housing 11, the guiding ridge 172 slides inward and get engaged with the guiding groove 152 of the movable shaft 15. Since the guiding ridge 172 and the guiding groove 152 are correspondingly slanted, the horizontal (radial) movement of the guiding pin 17 drives the vertical (axial) movement of the movable shaft 15 so as to lead the movable shaft 15 vertically move downward along the first shaft-receiving portion 112 and the second shaft-receiving portion 134. Therefore, when the ball propping section 154 moves downward, the ball receiving section 153 comes to align with the ball channels 135, so the balls 136 return into the ball channels 135 from the periphery 133 of the tool seat 13 and stop before the arched surface 155 below the ball receiving section 153. Thus, the surfaces of the balls 136 leave the periphery 133 of the tool seat 13 so that the tool head 70 previously retained by the surfaces of the balls 136 can be separate from the tool holder 10 through the lower end if the second shaft-receiving portion 134.

The disclosed tool holder 10 is beneficial by its capability of stably holding a tool. Also, the disclosed tool holder 10 can easily disengage a tool with simple yet effective mechanism. Therefore the disclosed tool holder 10 presents enhanced reliability and stability.

Figure 5:
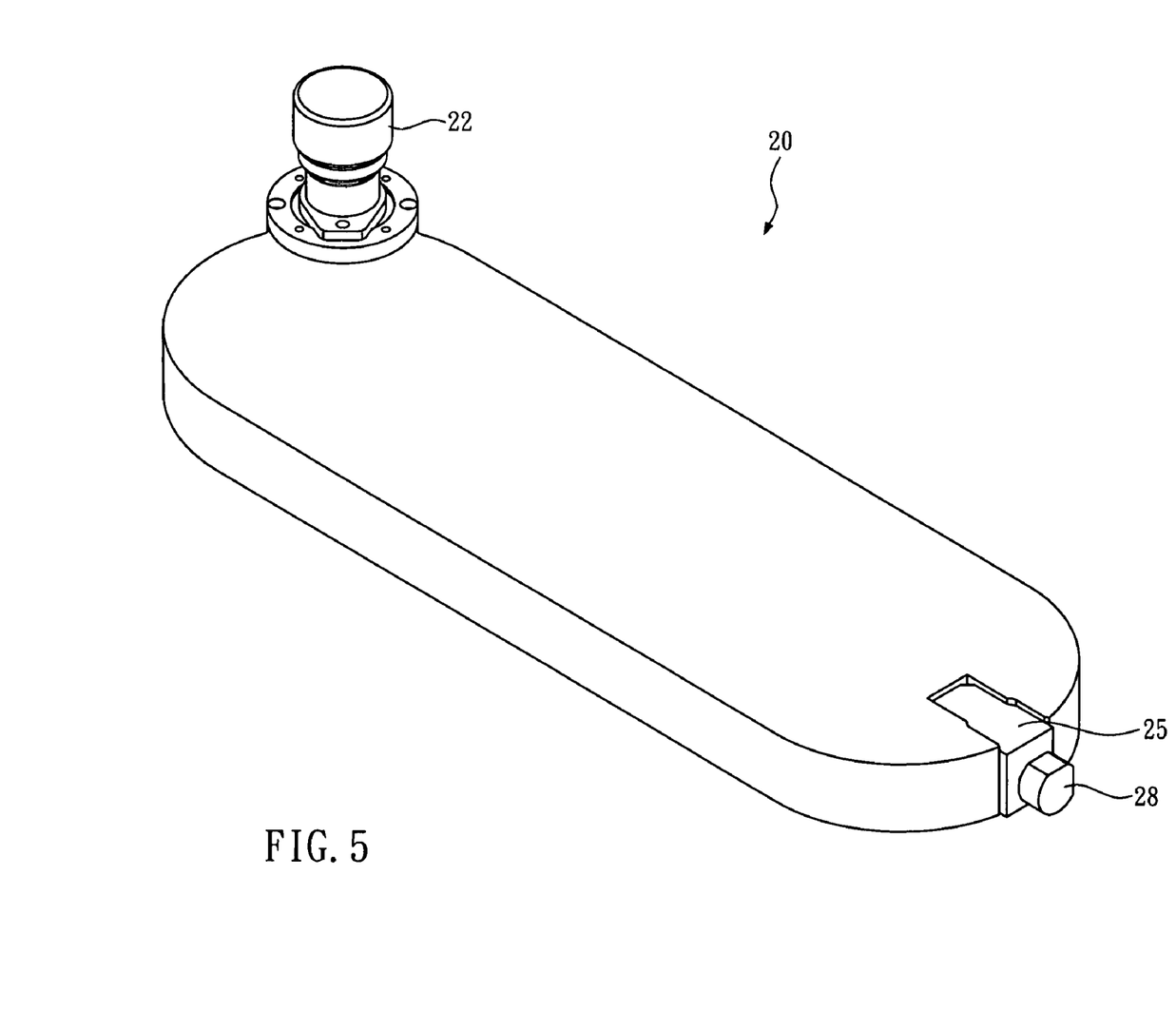
FIG. 5 is an oblique top elevation of a tool magazine of the present invention.
Figure 6:
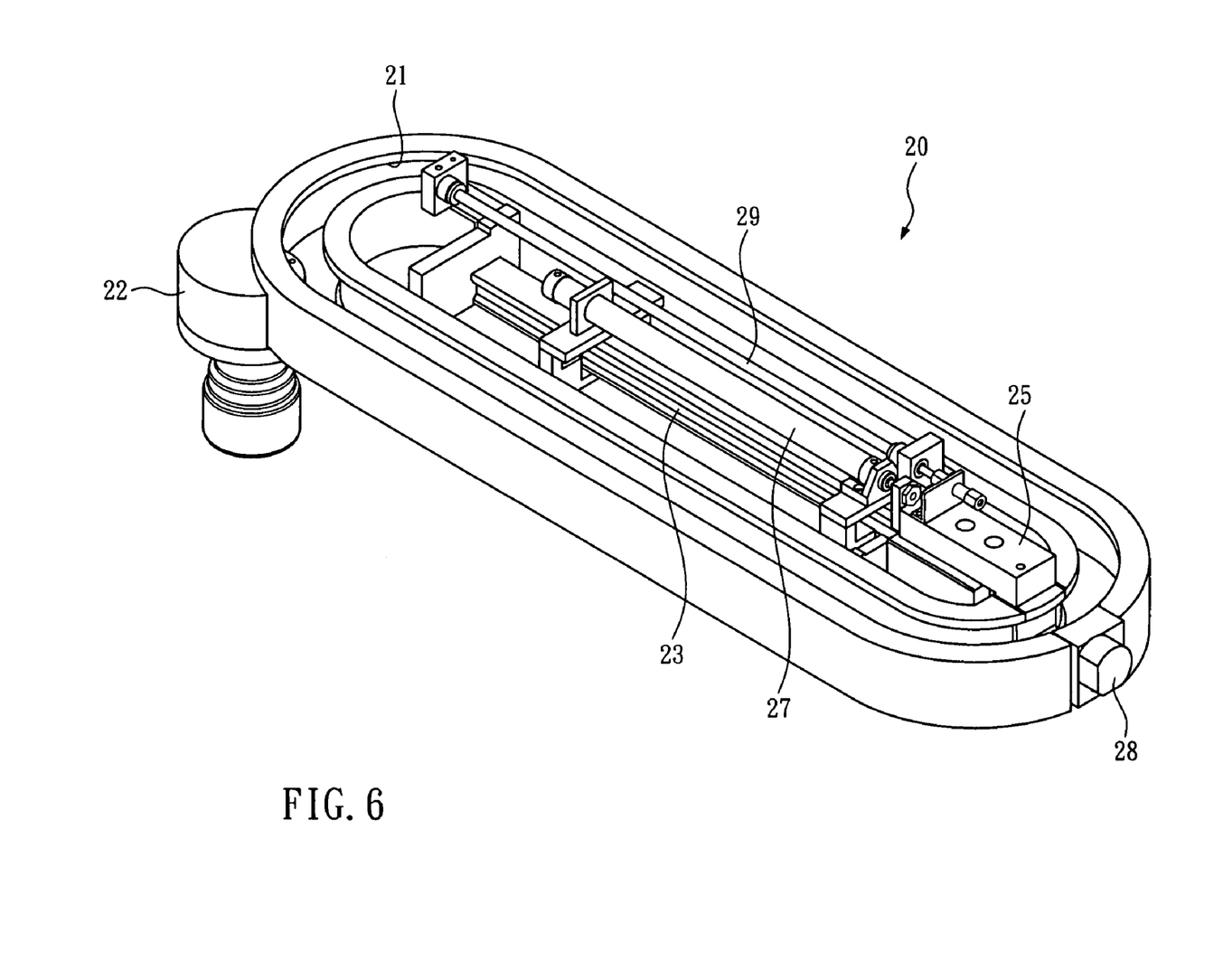
FIG. 6 is an oblique bottom elevation of the tool magazine of the present invention.
Figure 7:
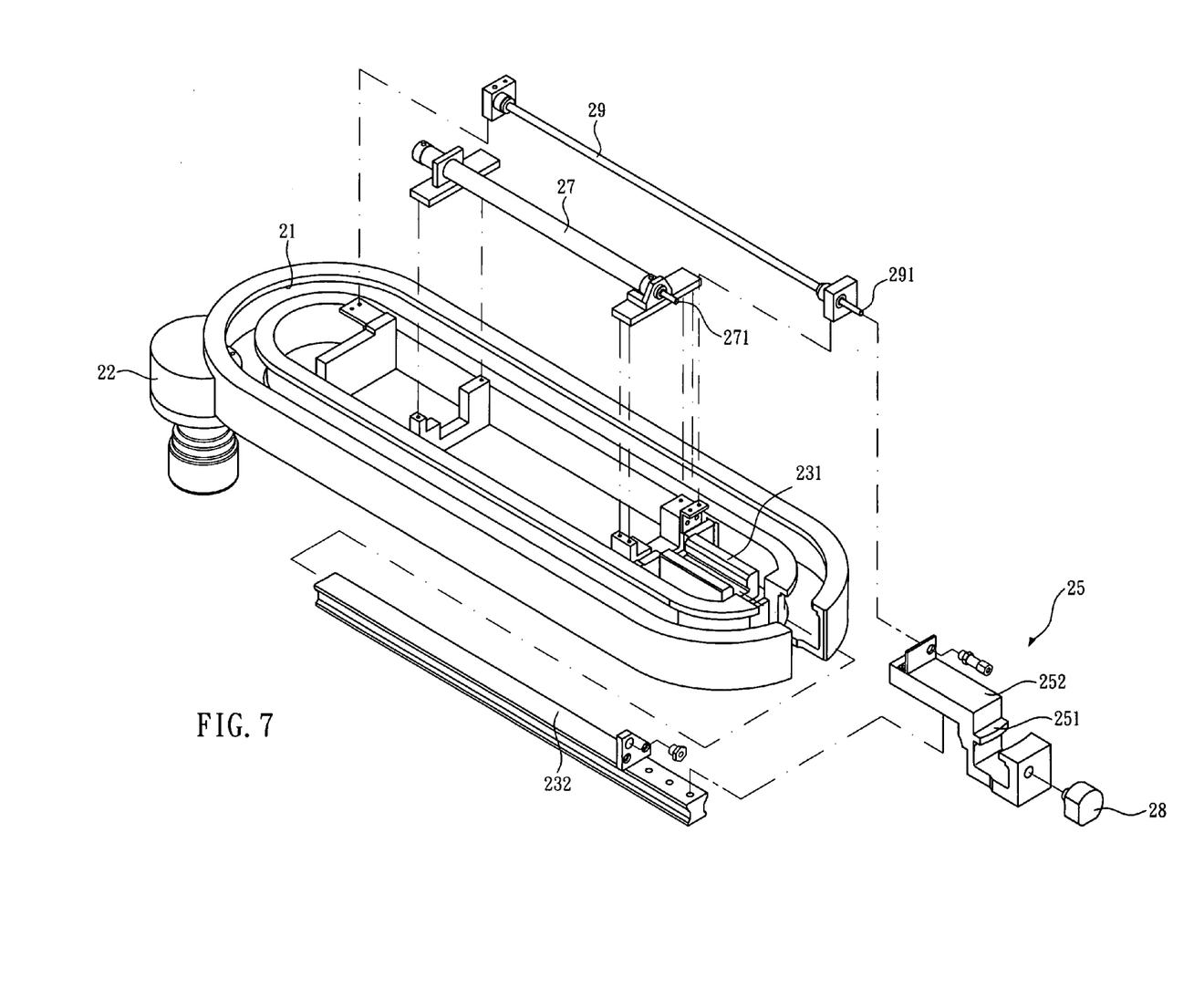
FIG. 7 is an exploded view of the tool magazine of the present invention.

The tool magazine of the present invention further comprises a magazine body 20, as shown in FIGS. 5 and 6. The magazine body 20 has a rail 21 for positioning the previously discussed tool holder 10. The rail 21 is driven by a motor 22 so that the tool holders 10 hanged thereon can move along the rail 21 and be delivered to a tool-delivering position. In FIGS. 6 and 7, it can be seen more clearly that the magazine body 20 further has a tool-delivering mechanism that comprises a tool-delivering extension 25, a sliding rail assembly 23, an extending cylinder 27, a tool-disengaging cylinder 28 and a telescopic gas pipe set.

The tool-delivering extension 25 comprises a movable rail segment 251 matching the rail 21 and forming an circular rail in the presence of the rail 32. The movable rail segment 251 has a driven arm 252 extended therefrom toward a center of the magazine body 20.

The sliding rail assembly 23 is composed of a guiding rail 231 fixedly attached below a lower surface of the magazine body 20 and a sliding rail 232 mounted around the guiding rail 231. The sliding rail 232 has its front end fixedly connected with the driven arm 252 of the tool-delivering extension 25 so that when the sliding rail 232 performs an extension with respect to the guiding rail 231, the tool-delivering extension 25 is supported by the sliding rail 232 to slide outward smoothly and makes the movable rail segment 251 attached thereon departed from the rail 32 of the magazine body 20.

The extending cylinder 27 serves to provide a driving force to move the tool-delivering extension 25 and the sliding rail assembly 23. The extending cylinder 27 is settled outside the sliding rail 232 and fixedly attached to the lower surface of the magazine body 20. The extending cylinder 27 has a shaft end fixedly connected with the driven arm. The extending cylinder 27 may be a normal power cylinder, such as a hydraulic cylinder or an air cylinder.

The tool-disengaging cylinder 28 is fixedly attached outside the movable rail segment 251 of the tool-delivering extension 25 and has its driving shaft settled forward the interior of the movable rail segment 251 so as to correspond to the guiding pin hole 114 of one said tool holder 10. The tool-disengaging cylinder 28 may be a normal air cylinder.

The telescopic gas pipe set includes an outer pipe 29 mounted outside the sliding rail 232 and fixedly fastened to the lower surface of the magazine body 20 and an inner pipe 291 fixedly connected to the driven arm 252 and communicated to the tool-disengaging cylinder 28. Therein, the outer pipe 29 and the inner pipe 291 are relatively extendable in respond to the movement of the tool-delivering extension 25. The telescopic gas pipe set is communicated to a high-pressure air source for providing the driving force to the tool-disengaging cylinder 28.

Thereby, the tool-delivering mechanism normally forms a closed circular rail together with the rail 21 and the movable rail segment 251. Each said tool holders 10 with its groove 111 engaged with the rail and is driven by the motor 22 to move along the rail. When tool change is required, a specific tool 70 is delivered to the tool-delivering position. Namely, when the specific tool 70 arrives the movable rail segment 251 of the tool-delivering extension 25, the motor 22 stops so that the tool 70 is positioned in the movable rail segment 251. At this time, the extending cylinder 27 is started and its shaft 271 drives the driven arm 252 of the tool-delivering extension 25 so that the driven arm 252 radially extends with respect to the magazine body 20. Consequently, the tool-delivering extension 25 fixedly connected to the sliding rail 232 and the tool 70 thereon are moved outward synchronously, so as to draw the sliding rail 232 of the sliding rail assembly 23 to extend from the guiding rail 231, thereby providing the tool-delivering extension 25 leaving the magazine body 20 with a reliable supporting force. In addition, since the inner pipe 291 of the telescopic gas pipe set is also fixedly connected with the tool-delivering extension 25, it also performs extension with respect to the outer pipe 29.

Figure 8:
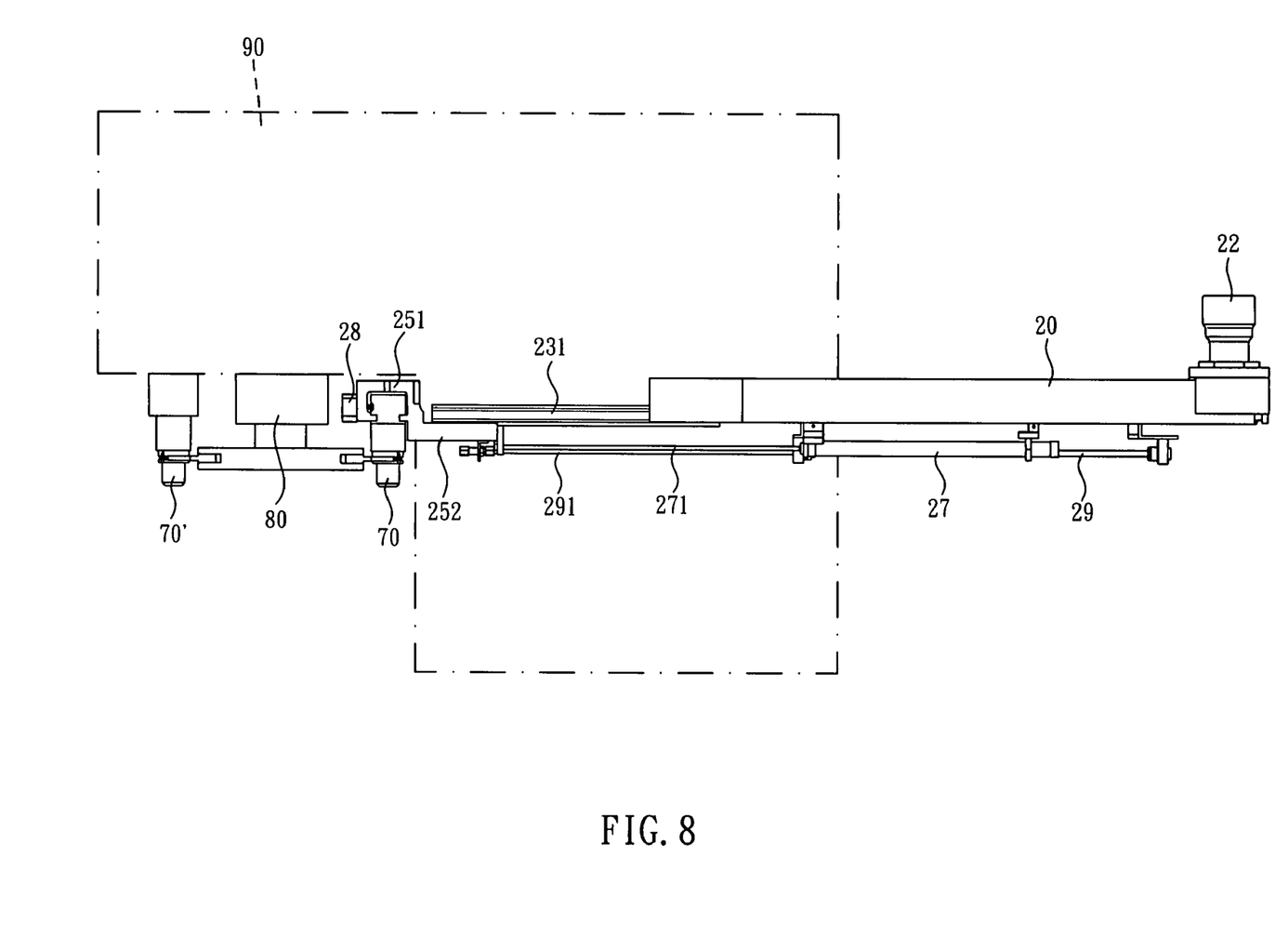
FIG. 8 is a schematic drawing showing the tool magazine, in cooperation with an automatic tool-changing arm, serving to a machine tool for changing tools.

When the tool-delivering mechanism extends to a predetermined position, as shown in FIG. 8, where the tool-delivering extension 25 delivers the tool 70 to a position corresponding to an tool-changing arm 80, a high-pressure air is sent to the tool-disengaging cylinder 28 though the outer pipe 29 and the extended inner pipe 291. After the tool-disengaging cylinder 28 is started, it pushes the guiding pin 17 settled in the guiding pin hole 114 of the tool holder 10, so that the guiding pin 17, as previously described, drives the movable shaft 15 in the tool holder 10 to move downward and then the balls stop retaining the tool 70, thereby freeing the tool 70 from the tool holder 10. The dropped tool 70 is well retained and exchanged with another tool (70') to be disassembled from the machine tool by the tool-changing arm 80 so as to accomplish required tool change.

The primary advantage of the tool-delivering mechanism is being free from the limitation of the position of the tool-changing arm so as to be installed behind he machine tool, thereby preventing the asymmetric balance of the entire machine tool.

Besides, the sliding rail assembly 23 provides the moving tool-delivering extension 25 with a reliable supporting force, so as to ensure a smooth and safe tool change.

Furthermore, the telescopic gas pipe set frees the tool-disengaging cylinder 28 from additional air pipe that may impede the tool delivery so as to optimize the tool-delivering mechanism of the present invention.

Although the particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. A tool magazine of an automatic tool changer applicable to a machine tool, comprising a magazine body and a plurality of tool holders each being slidably attached to a rail fixed to the magazine body and holding a tool head having a longitudinal axis, which tool magazine is characterized by that the tool magazine includes a tool-delivering mechanism for delivering one of the tool holders that holds a respective one of the tool heads to a predetermined position away from the magazine body and for disengaging the respective tool head from the one tool holder, the tool-delivering mechanism comprising a movable rail segment matching the rail and movable relative to the rail between first and second positions, wherein in the first position of the movable rail segment, the moveable rail segment together with the rail forms a closed endless rail, and in the second position, the movable rail segment does not form a closed endless rail together with the rail, and wherein the tool holders each include a pin radially arranged with respect to the longitudinal axis and actuatable by the tool-delivering mechanism to disengage a respective tool head from a respective tool holder.

2. The tool magazine of claim 1, wherein the tool-delivering mechanism further comprises:
  a tool-delivering extension, comprising the movable rail segment, and wherein the movable rail segment has a driven arm extended therefrom toward a center of the magazine body;
  an extendable sliding rail assembly, being fixedly attached to the driven arm of the tool-delivering extension so that when the sliding rail assembly is extended, the movable rail segment is in the second position; and
  an extending cylinder, serving to provide a driving force to move the tool-delivering extension and the sliding rail assembly;
  whereby the tool-delivering mechanism is capable of delivering the one tool holder that holds the respective tool head to the predetermined position away from the magazine body and disengaging the respective tool head from the one tool holder.

3. The tool magazine of claim 2, wherein the sliding rail assembly is composed of a guiding rail fixedly attached below a lower surface of the magazine body and a sliding rail mounted at the guiding rail, in which the sliding rail has a front end fixedly connected with the driven arm of the tool-delivering extension.

4. The tool magazine of claim 3, wherein the extending cylinder is settled outside the sliding rail and fixedly attached to the lower surface of the magazine body and has a shaft end fixedly connected with the driven arm.

5. The tool magazine of claim 4, wherein the extending cylinder is a hydraulic cylinder.

6. The tool magazine of claim 1, wherein the rail is used for positioning plural said tool holders.

7. The tool magazine of claim 6, wherein a motor is provided to drive the tool holders to move along the rail.

8. The tool magazine of claim 6, wherein each of the tool holders comprises:
  a housing, having an accommodating space axially formed therein;
  a tool seat, settled in the housing and radially formed with at least one ball channel in which a ball is settled; and
  a movable shaft, slidably settled in the accommodating space and having one end pierced into the tool seat to form an arched surface;
  wherein the movable shaft moves axially to control the ball between jutting out or retracted positions from a surface of the tool seat so as to retain or disengage the respective tool head.

9. The tool magazine of claim 8, wherein a guiding pin hole is formed on the housing corresponding to the movable shaft and diverging from an axis of the housing while being communicated with the accommodating space.

10. The tool magazine of claim 9, wherein the pin is a guiding pin and is movably settled in the guiding pin hole and perpendicular to the movable shaft, and wherein the movable shaft and the guiding pin have matching slanted structures so that a movement of the guiding pin that is radial relative the housing axis drives a movement of the movable shaft that is axial relative to the housing axis.

11. The tool magazine of claim 10, wherein the movable shaft has a slanted guiding groove and the guiding pin has a guiding ridge matching the guiding groove.

12. The tool magazine of claim 10, wherein the tool-delivering mechanism further comprises a tool-delivering extension, and wherein the tool-delivering extension further has a tool-disengaging cylinder, which has a driving shaft thereof settled toward the movable rail segment to align to the guiding pin hole of the respective tool holder.

13. The tool magazine of claim 12, wherein the tool-disengaging cylinder is an air cylinder.

14. The tool magazine of claim 12, wherein the tool-delivering mechanism further comprises a telescopic gas pipe set, which has one end fixedly combined with the magazine body and has an opposite end combined with the tool-delivering extension in gaseous communication with the tool-disengaging cylinder.

15. The tool magazine of claim 14, wherein the telescopic gas pipe set includes an outer pipe and an inner air pipe, in which the inner air pipe is connected to the tool-delivering extension and the outer pipe is fixedly attached to the magazine body, said inner pipe being slidably settled in the outer pipe.

* * * * *